April 22, 1930.  W. I. MIDDLETON  1,755,930
POWER CABLE
Filed April 26, 1929
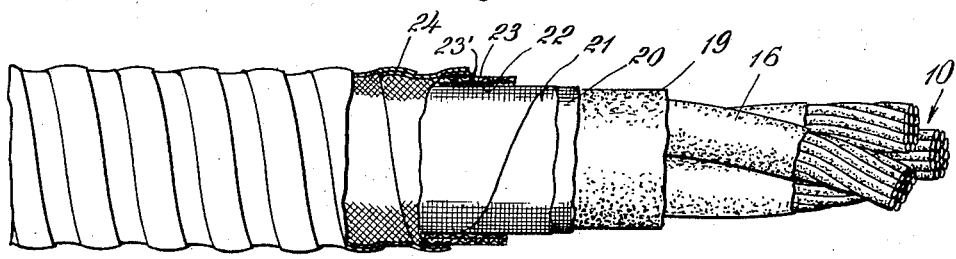
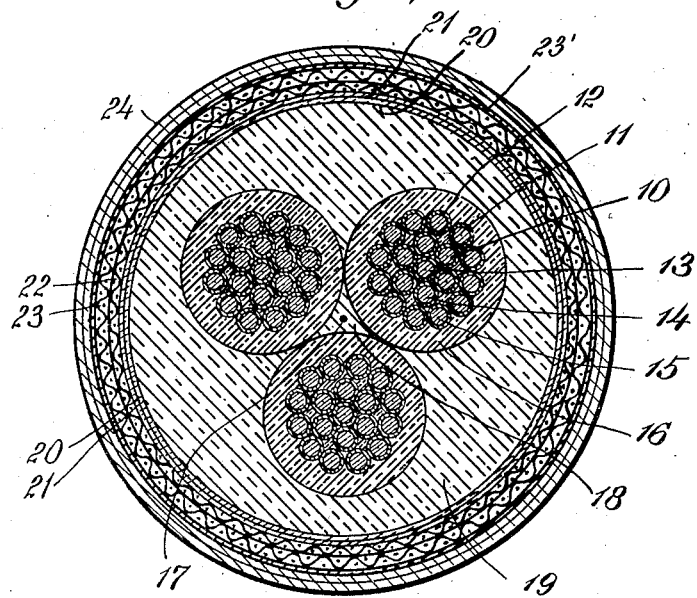
INVENTOR
Washington Irving Middleton
BY
ATTORNEYS Patented Apr. 22, 1930

1,755,930

UNITED STATES PATENT OFFICE

WASHINGTON IRVING MIDDLETON, OF WATERTOWN, MASSACHUSETTS, ASSIGNOR TO SIMPLEX WIRE AND CABLE COMPANY, OF BOSTON, MASSACHUSETTS, A CORPORATION OF MASSACHUSETTS

POWER CABLE

Application filed April 26, 1929. Serial No. 358,227.

This invention relates to improvements in power cables. By "power cables" reference is intended to cables used for transmitting electric power, as currents of substantial amperage, to electric power motors and similar power devices.

This invention relates more particularly to an improved power cable adapted to be used, economically, under conditions peculiarly severe limiting the utility of ordinary power cables. The improved power cable of this invention is adapted to resist deterioration although submerged in oil or oil-water or oil-water-salt mixtures for indefinite periods without being excessively bulky or heavy and without being prohibitively expensive. The improved cable of the invention is also adapted to minimize possible physical damage even under extreme conditions.

While the improved power cable of this invention is suitable for many purposes, it is particularly adapted for use in connection with the pumping of oil from wells as now carried on by means of an electrically driven pump lowered through the well casing to the bottom of the well, where it remains in operation for indefinite periods. The power cable for the motor of such a pumping unit is necessarily subjected to severe conditions during its installation, and throughout its use it is continuously exposed to the action of the oil or oil mixture being pumped. Oil causes rapid deterioration of rubber and the usual rubber insulating compounds, as is well known, and this deterioration seems to be promoted by the presence of water or the saline materials frequently occurring with oil, so that the problem of insulating the conductors of a cable for this use involves peculiar difficulties. Also, since the conductors are connected to the motor leads under a substantial head of the oil, there is a tendency for the oil or oil mixture to enter the submerged end of the cable and to flow into the cable through the interstices between the conductors, with consequent internal deterioration of the cable. Further, such power cables must meet obvious requirements as to bulk and weight.

The power cable of the present invention is constructed for such uses, as that above-mentioned, and for various others, where insulation of the conductors and the protection of such insulation is difficult because of the conditions under which the cable is used. The improved cable of the invention is of small diameter and is light in weight, it is flexible and, although a part of the insulation is made up of rubber, the rubber is effectively protected against deterioration through contact with deteriorating liquids and against mechanical injury and the flow of such liquids into the cable at exposed ends is prevented.

In the improved cable of the invention, the conductor or conductors are made up of cabled strands of copper, preferably tinned, and laid in such manner that there is a central strand and layers of other strands wrapped about it. The interstices between the strands are filled with rubber and the conductor itself is encased in a rubber sheath. Where the cable is made up of several conductors they are wrapped about one another in the usual way and enclosed in a sheath of rubber which fills all the interstices between the rubber sheaths on the individual conductors. Over the outside of the rubber sheath which encloses all the conductors is laid fabric insulation which may be in the form of tapes or braids or both, the fabric being impregnated and coated with an oil and water-proof lacquer. A lacquer of the nitrocellulose type is well suited for this purpose. The lacquer is applied in such manner as to form a continuous film over the fabric. A protective armor is then laid over the lacquer film, this armor protecting the enclosed cable elements from injury during handling, installation and use.

For a better understanding of the invention, reference may be had to the accompanying drawings in which—

Fig. 1 is a view in side elevation of a length of the new cable with various coverings broken away to show the construction; and Fig. 2 is a cross-sectional view of the cable illustrated in Fig. 1.

The cable illustrated includes three conductors and is adapted for supplying power to a three-phase motor. The cable may be constructed with a greater or less number of conductors according to the use to which it is to be put.

The conductors generally designated 10 consist of a plurality of individual wire strands 11, each of which is made of copper, preferably tinned, the tin coating being designated 12. In forming these conductors, the central strand 13 is encased in a layer of unvulcanized rubber and then a row of strands 14 is wrapped about it helically. The laying of the conductors of the row 14 is carried on so that these conductors become embedded in the soft unvulcanized rubber layer enclosing the central strand and so that the rubber fills the interstices between the outside strands and the central strand. After the strands of the layer 14 are laid in place, another layer of unvulcanized rubber is placed about them and a third layer 15 of conductors is laid on the rubber in the same way. The rubber fills the interstices between the layers. The conductors made up of the several strands is now enclosed in an insulating sheath 16 of unvulcanized rubber. The composite conductor is now treated to vulcanize the rubber filling and insulation.

In the cable illustrated, the three conductors with their rubber sheaths are cabled about a strand 17 covered with unvulcanized rubber and serving as an axial core. In this cabling operation the rubber core assumes the somewhat triangular shape illustrated at 18 and entirely fills the space between the sheaths of the three conductors. An outer sheath or jacket of unvulcanized rubber 19 is now applied to the cable and thereafter the cable is treated to vulcanize the rubber in the core and jacket.

As a further insulation, layers of fabric are employed; in the construction illustrated there are two layers of fabric tape 20 and 21 laid helically about the rubber sheath 19. The tape of each layer is applied so that the edges abut with the tapes in the two layers out of registry. The tape used is preferably varnished cambric and before it is laid the surface of the rubber sheath is coated with an oil and water-proof lacquer advantageously of the nitro-cellulose type. After a layer of tape is placed in position, another coating of lacquer is applied to it. Over the lacquer coating may be applied further fabric insulation in the form of cotton braids 22 laid in the usual manner. One or more coats of lacquer are applied over the braid layer so that the braid is saturated with the lacquer, and over this lacquer film is preferably applied another layer of braid 23, over which further coatings of lacquer are applied. The fabric in these layers of insulation is not only saturated with lacquer but there are lacquer coatings under, over and between the several fabric layers.

The cable is completed by the application of a sheath of armor 24 which may conveniently take the form of a metallic tape, galvanized steel, aluminum, etc., laid in overlapping convolutions over the outer film of lacquer 23', the tape being formed so that the overlapping parts are locked together.

It will be observed that in this cable the interstices between the conductors are completely filled with rubber and rubber is applied around several conductors so that the entire center of the cable is filled. The rubber used is unvulcanized when applied so that it may be readily shaped to fill the spaces which it is intended to occupy. The rubber sheath which encloses the several conductors is protected by a plurality of layers of fabric impregnated with lacquer and also by a plurality of lacquer films. The lacquer protects the rubber against the action of oil and water from the outside and since the interior of the cable is filled with rubber, oil and water cannot migrate through the interior of the cable in the event that an end of the cable is exposed. Even though the rubber filling should be attacked at an exposed end of the cable, any deterioration of the insulation is so limited that the cable will stand up for an indefinite period, whereas if the interior of the cable were not filled substantial quantities of oil and water might enter through an exposed end and thus bring about deterioration of the rubber insulation over substantial distances.

I claim:

1. A power cable which comprises at least a pair of conductors twisted around one another and each formed of cabled strands in layers, the interstices in each conductor being filled with rubber, a rubber sheath around the conductors, a layer of insulating fabric over the rubber sheath, a continuous film of oil-proof lacquer over the fabric, and a sheath of armor over the film.

2. In a power cable, a plurality of conductors twisted helically about one another, each conductor being made up of cabled strands with rubber filling the interstices between the strands, a rubber sheath about each conductor, a central cord about which the conductors are laid, a rubber filling about the cord and filling the space between the sheaths of the several conductors, and a rubber sheath enclosing all the conductors and having portions filling the spaces between the rubber sheaths on individual conductors.

3. An article of manufacture comprising a plurality of electrically connected conducting strands cabled together to form a single electrical conductor in which the current passes in the same direction through all of the strands forming the conductor, the interstices within the conductor being filled with rubber, and a rubber sheath around the conductor.

4. An article of manufacture comprising a plurality of electrically connected conducting strands disposed in layers and forming a single electrical conductor in which the current passes in the same direction through all of the strands forming the conductor, the interstices between the strands being filled with rubber, and a rubber sheath around the conductor.

5. An article of manufacture comprising a plurality of electrically connected conducting strands cabled together to form a single electrical conductor in which the current passes in the same direction through all of the strands forming the conductor, the interstices in the conductor being filled with rubber, a rubber sheath around the conductor, a layer of insulated fabric over the sheath, a continuous film of oil-proof lacquer over the layer, and a sheath of armor over the film.

In testimony whereof I affix my signature.

WASHINGTON IRVING MIDDLETON.

DISCLAIMER 1,755,930.—*Washington Irving Middleton,* Watertown, Mass. POWER CABLE. Patent dated April 22, 1930. Disclaimer filed March 29, 1933, by the patentee, assignee, *Simplex Wire & Cable Company,* consenting.

Hereby enters this disclaimer to exclude from the scope of claims 1, 2, 3, 4, and 5 of said specification, cables and conductors in which the interstices within the conductors or between the strands of the conductors are filled with rubber cement, varnish, lacquer, or filling compounds other than rubber or containing volatile solvents, and to limit said claims specifically to cables and conductors in which the interstices within the conductors or between the strands of the conductors are filled with rubber.

[*Official Gazette April 18, 1933.*]